United States Patent [19]

Wang

[11] Patent Number: 5,458,020

[45] Date of Patent: Oct. 17, 1995

[54] PULL ROD STRUCTURE OF A BAGGAGE CART

[76] Inventor: Chien-Shan Wang, No. 80, Lin 8, Tien Hsin Li, Yuan-Li Chen, Miao Li Hsien, China

[21] Appl. No.: 285,025

[22] Filed: Aug. 2, 1994

[51] Int. Cl.[6] ................................ B62B 1/12; G05G 5/06
[52] U.S. Cl. .................... 74/527; 280/655; 280/655.1; 280/47.315; 403/109; 403/325
[58] Field of Search ............................ 74/527, 526, 557; 280/651, 652, 655, 655.1, 47.24, 47.315; 403/109, 104, 106, 107, 108, 83, 325, 377

[56] References Cited

U.S. PATENT DOCUMENTS

| | | | |
|---|---|---|---|
| 4,591,183 | 5/1986 | Gordon et al. | 280/655 |
| 5,127,664 | 7/1992 | Cheng | 280/655 |
| 5,257,800 | 11/1993 | Yang | 280/655 X |
| 5,308,103 | 5/1994 | Chin-Shung | 280/655 |
| 5,351,984 | 10/1994 | Cheng | 280/47.315 X |
| 5,367,743 | 11/1994 | Chang | 280/47.315 X |
| 5,371,923 | 12/1994 | Chang | 280/655 X |

FOREIGN PATENT DOCUMENTS 404183673  6/1992  Japan ........................... 280/655

*Primary Examiner*—Rodney H. Bonck
*Assistant Examiner*—Mary Ann Battista
*Attorney, Agent, or Firm*—Browdy and Neimark

[57] ABSTRACT

A pull rod structure of a baggage cart, comprising a handle body, a controlling mechanism, a lower cover, a transmission mechanism, a linking mechanism, two hollow tube members and two sleeve members. The handle body is formed with two through holes at two ends and two insert holes formed beside the through holes. A locking channel is formed under the insert hole for receiving a locking block. A pull lever is disposed on one side of the handle body, having two ends inserted in the insert holes thereof to couple with the locking block. The locking block receives a spring and the pull lever. A long pin fixedly connects the pull lever with the locking block and a short pin is inserted into a pin hole of the locking block, a pin hole of the pull lever and the spring so as to fix the pull lever with the locking block. The long pin partially protrudes outside the locking block to press a pressing lever of the transmission mechanism. The pressing lever is fitted with a spring and a locating block and inserted in the hollow tube member. The linking mechanism includes a slant triangular block connected with a lower end of the pressing lever, a valve seat, a spring, a pad member, a fixing sleeve and a fixing plate. The sleeve member receives the transmission and linking mechanisms and formed with several lateral locating holes for engaging with a projection of the valve seat of the linking mechanism.

1 Claim, 4 Drawing Sheets

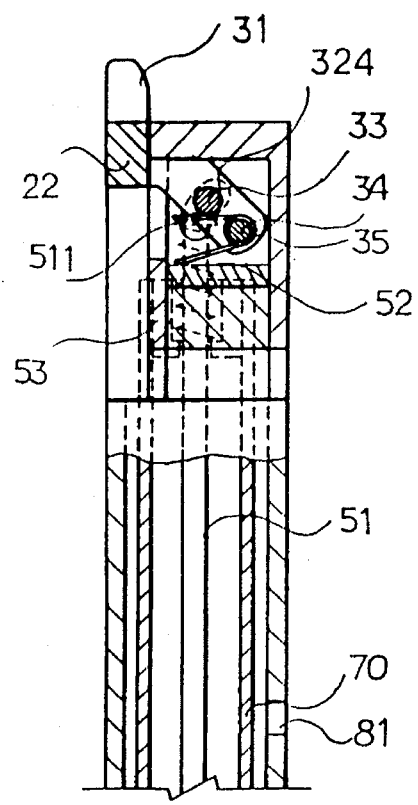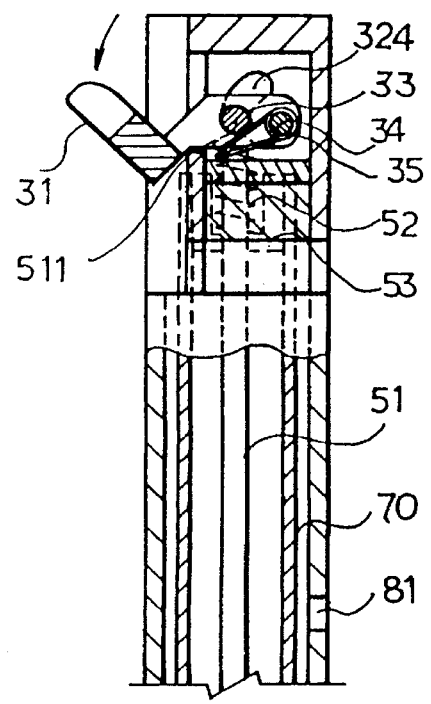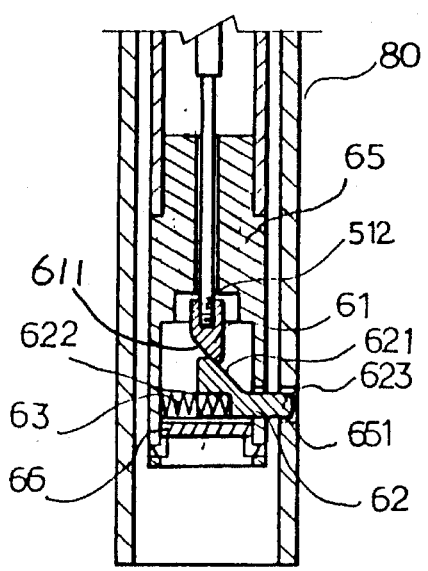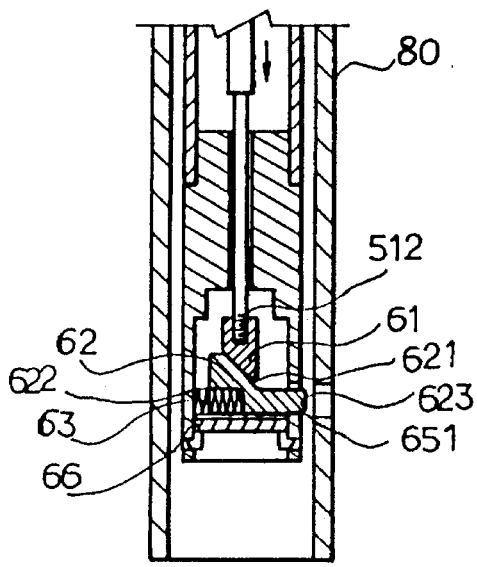
FIG. 4  FIG. 5

PULL ROD STRUCTURE OF A BAGGAGE CART

BACKGROUND OF THE INVENTION

The present invention relates to a pull rod structure of a baggage cart, and more particularly to a pull rod structure which can be easily and quickly operated and firmly located.

A conventional baggage cart serves to facilitate the carriage of the baggages of a traveller. However, some shortcomings in use exist in the pull rod structure of such baggage cart. AS shown in FIG. 1, the handle 2 and the pull rods 3 of the conventional baggage cart are integrally connected. Each pull rod 3 is sleeved by a sleeve 4 and a rubber plate 5 formed with an eccentric hole 51 is fitted on a threaded lower end of the pull rod 3. A mushroom pad 41 is disposed at a top end of the sleeve 4. The shortcomings of such arrangements are as follows:

1. It is difficult to move the pull rods up and down when adjusting the length thereof. This is because the rubber plate 5 is eccentrically disposed and thus a great frictional force is created, between the rubber plate 5 and the pull rod 3 to resist the movement thereof. Therefore, when adjusting the length of the pull rods 3, a user must operate the pull rods 3 with both hands and exert a great force on the pull rods 3 in order to lift or press down the pull rods 3.

2. After a period of use, the rubber plate 5 is likely to deform due to the friction against the pull rod 3. Therefore, it often occurs that the pull rods 3 become loosened during the transferring of the baggages. This may make the user slip and fall down.

SUMMARY OF THE INVENTION

It is therefore a primary object of the present invention to provide an improved pull rod structure of a baggage cart, which can be quickly and easily operated and located. In addition, the length of the pull rod can be adjusted with little force.

According to the above object, the pull rod structure of the present invention includes a handle body having a pull lever. The pull lever can be moved up and down by a user's finger to control a linking mechanism through a transmission mechanism. The linking mechanism has a valve seat which is urged by a spring and a slant triangular block to extensibly move within a sleeve and locked in a locating hole thereof. The pull lever is controllable by the user's finger to freely adjust the height of the pull rod structure and firmly locate the same at a desired level.

The present invention can be best understood through the following description and accompanying drawings, wherein:

BRIEF DESCRIPTION OF THE DRAWINGS

FIG. 4 is a sectional view of the transmission mechanism of the present invention in an locked state; and FIG. 5 is a sectional view according to FIG. 4, showing the transmission mechanism in a locked state.

DETAILED DESCRIPTION OF THE PREFERRED EMBODIMENT

Figure 1:
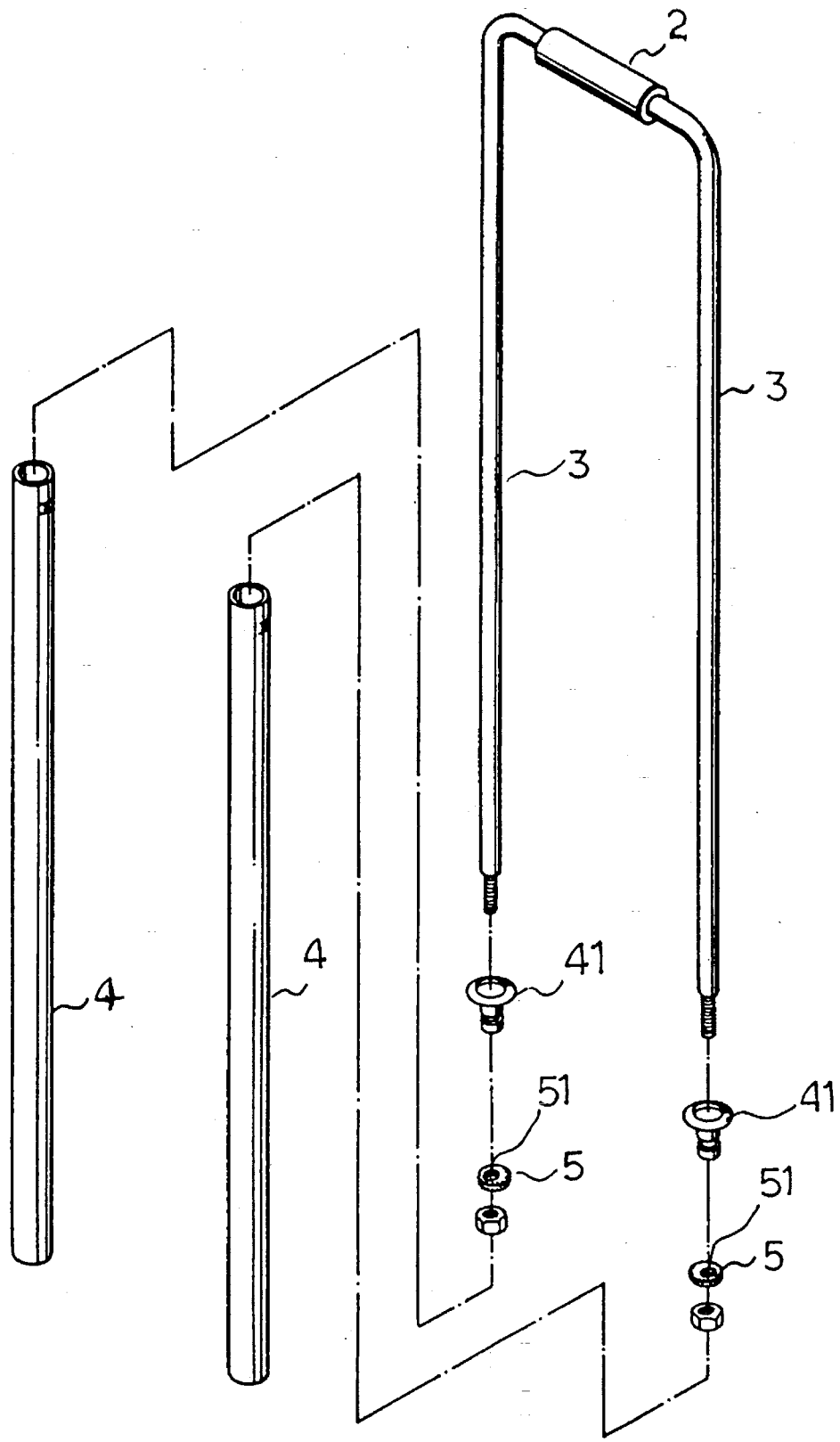
FIG. 1 is a perspective exploded view of a conventional pull rod structure of a baggage cart.
Figure 2:
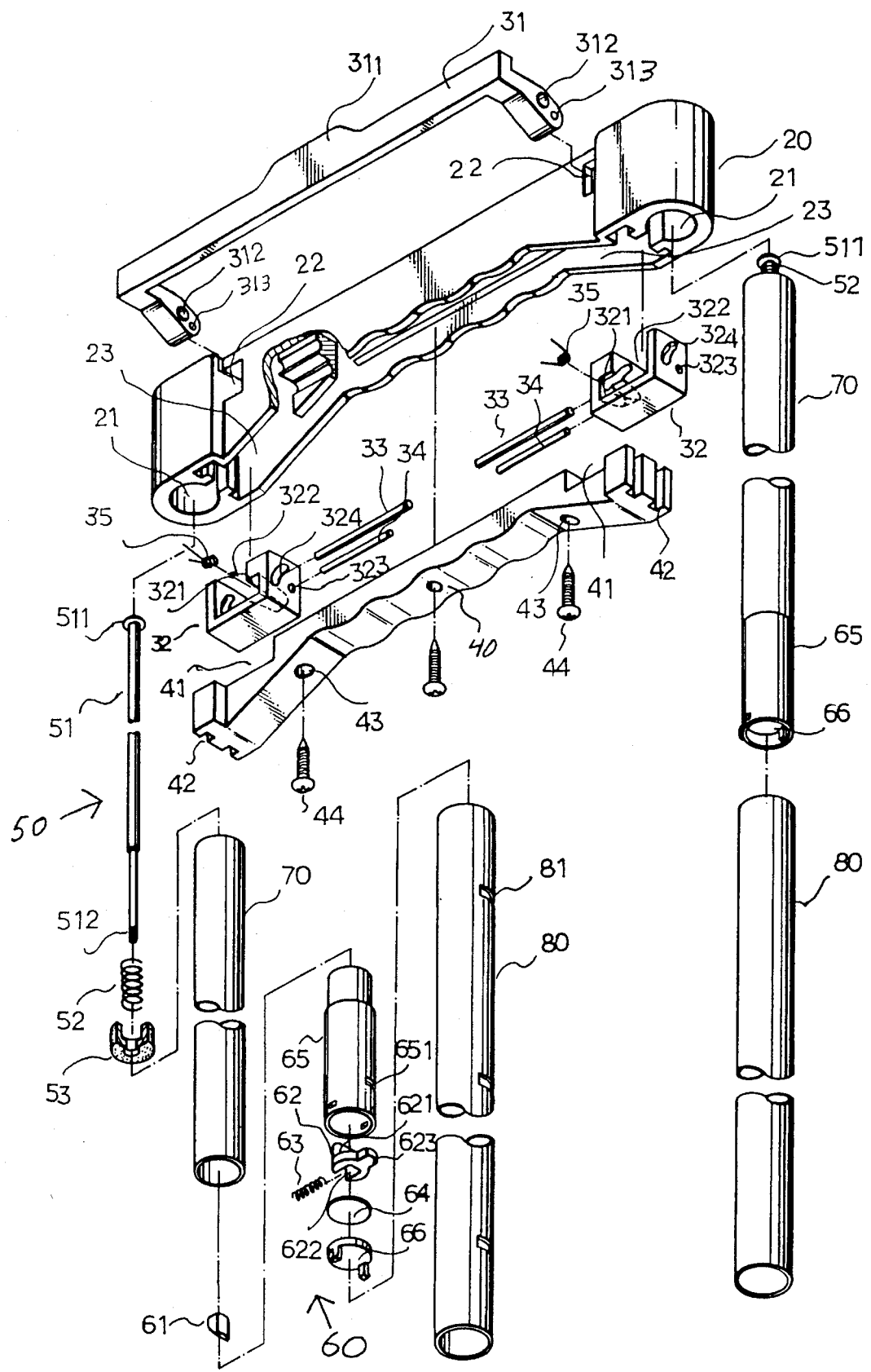
FIG. 2 is a perspective exploded view of the present invention.

Please refer to FIG. 2. The pull rod structure of the present invention mainly includes a handle body 20, a controlling mechanism, a lower cover 40, a transmission mechanism 50, a linking mechanism 60, two hollow tube members 70 and two sleeve members 80.

The handle body 20 has two ends each of which is formed with a through hole 21. An insert hole 22 is formed beside each through hole 21 and a locking channel 23 is formed under the insert hole 22. Several thread holes are disposed in the locking channel 23.

The controlling mechanism includes a pull lever 31, two locking blocks 32, two long pins 33, two short pins 34 and two springs 35. The pull lever 31 is U-shaped and disposed on one side of the handle body 20, having two bent free ends. A driving block 311 is formed on a middle section of the pull lever 31 and two pin holes 312, 313 are formed on each free end of the pull lever 31. The locking block 32 has a thicker side wall formed with a V-shaped notch 321 for disposing the spring 35 therein and a thinner side wall formed with a pin hole 323 and an arch hole 324. An insert channel 322 is defined between the thicker and thinner side walls for inserting the pull lever 31 therein. The long pin 33 is inserted into the arch hole 324 and the pin hole 312 of the pull lever 31 so as to fix the pull lever 31 in the locking block 32. The long pin 33 partially protrudes outside the locking block 32. The short pin 34 is inserted into the pin hole 323, the pin hole 311 of the pull lever 31 and the spring 35 so as to fix the pull lever 31 with the locking block 32.

The lower cover 40 is disposed under the handle body 20, having two ends each of which is formed with a recess 41 for fitting the locking block 32 therein. An insert block 42 is disposed beside the recess 41 and several thread holes 43 and screws 44 are disposed through the lower cover 40 corresponding to the thread holes of the handle body 20.

The transmission mechanism 50 includes a pressing lever 51, a spring 52 and a locating block 53. The pressing lever 51 has a top mushroom cap 511 and a lower thread end 12. The locating block 53 is disposed at a lower end of the spring 52, making the spring 52 fixedly connected with an upper end of the hollow tube member 70. The spring 52 is positioned under the mushroom cap 511 of the pressing lever 51.

The linking mechanism 60 includes a slant triangular block 61 having tapered lower end, a valve seat 62, a spring 63, a pad member 64, a fixing sleeve 65 and a fixing plate 66. The slant triangular block 61 has a slant side 611 and the valve seat 62 has a slant side 621 corresponding to the slant side 611 of the triangular block 61. The valve seat 62 is formed with a lower lateral notch 622 for disposing the spring 63 therein. The valve seat 62 is further formed with a projection 623 opposite to the notch 622. The pad member 64 is disposed under the valve seat 62. The above assembly is fixed in the fixing sleeve 65 which is formed with a lateral orifice 651 for the projection 623 of the valve seat 62 to extend outside therethrough. The fixing plate 66 is fitted into a lower end of the fixing sleeve 65 to enclose the above assembly.

The hollow tube member 70 is inserted into the through hole 21 of the handle body 20 and a lower end of the hollow tube member 70 is inserted into the fixing sleeve 65.

The sleeve member 80 is disposed outside the hollow tube member 70 and formed with several lateral locating holes 81.

Figure 3:
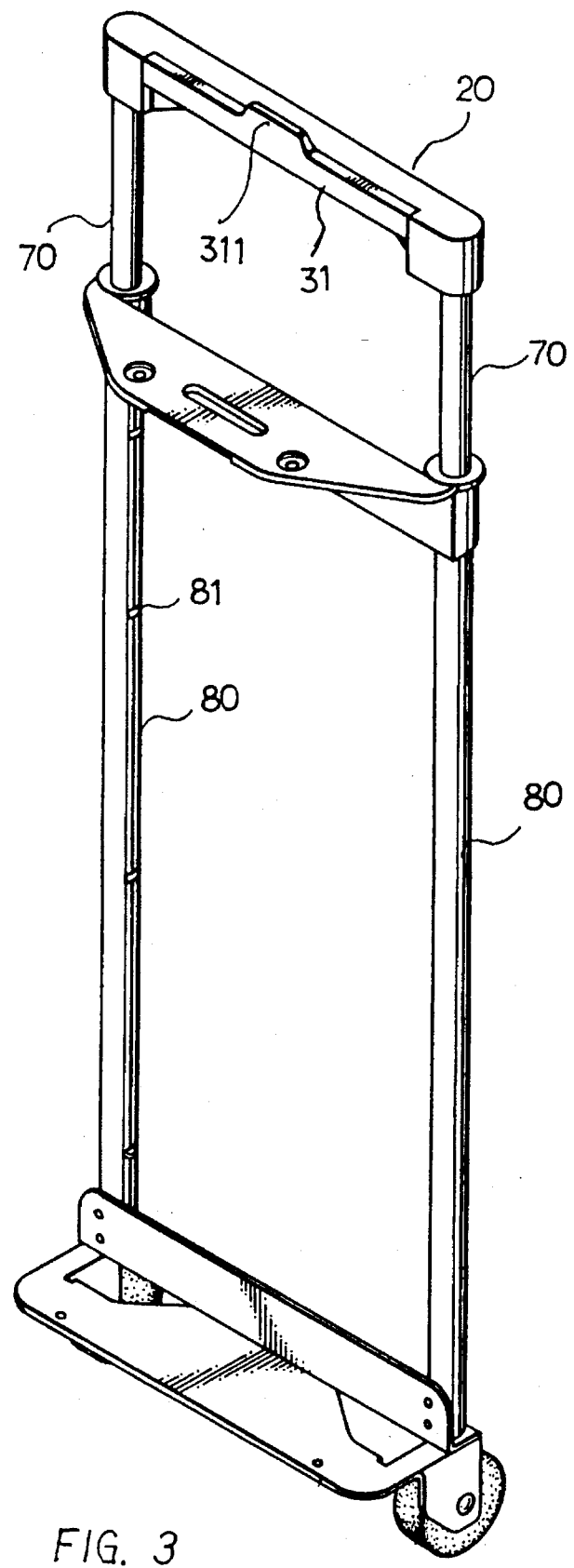
FIG. 3 is a perspective assembled view according to FIG. 2.

Please refer to FIGS. 3 to 5. The driving block 311 of the pull, lever 31 is moved by a user's finger, making the pull lever 31 move downward and drive the long pin 33 to move downward along the arch hole 324 of the locking block 32. At this time, the long pin 33 forces the pressing lever 51 of the transmission mechanism 50 to move downward. Referring to FIG. 4, when the pressing lever 51 moves downward, the triangular block 61 thereunder is driven to move downward, making the slant side of the triangular block 61 slide relative to the slant side of the valve seat 62. At this time, the valve seat 62 is urged by the triangular block 61 to make the projection 623 retract from the orifice 651 into the fixing sleeve 65. At this time, the entire pull rod structure can be freely telescoped. Please refer to FIG. 5. When the pull lever 31 is restored to its original position by the Spring 35 and the pressing lever 51 is released from the pressing of the long pin 33, the pressing lever 51 is restored to its original position by the spring 52 to drive the triangular block 61 to move upward. At this time, the valve seat 62 is biased by the spring 63, thereunder to make the projection 623 protrude outside the orifice 651 of the fixing sleeve 65. Also, the projection 623 protrudes outside one of the locating hole 81 of the sleeve member 80 in order to fix the pull rod structure on a desired level.

In conclusion, by means of the handle body 20, the pull rod structure of the baggage cart can be more easily operated. In addition, by means of the linking mechanism 60, the pull rod structure can be more conveniently elongated and shortened and more firmly located.

The above preferred embodiment is only an example of the present invention and the scope of the present invention should not be limited to the example. Any modification or variation derived from the example should fall within the scope of the present invention.

What is claimed is:

1. A pull rod structure of a baggage cart, comprising a handle body, a controlling mechanism, a lower cover, a transmission mechanism, a linking mechanism, two hollow tube members and two sleeve members, wherein:

said handle body has two ends each of which is formed with a through hole, an insert hole being formed beside each said through hole and a locking channel being formed under said insert holes, several thread holes being disposed in said locking channel;

said controlling mechanism includes a pull lever, two locking blocks, two long pins, two short pins and two springs, said pull lever being U-shaped and disposed on one side and said handle body, having two bent free ends, a driving block being formed on a middle section of said pull lever and two pin holes being formed on each of said two bent free ends of said pull lever, each said locking block receiving a respective one of said springs and said pull lever, each said short pin being inserted into a pin hole of a respective one of blocks said locking and a pin hole of said pull lever and through a respective one of said springs so as to fix said pull lever with each said locking block;

said lower cover is disposed under said handle body, having two ends each of which is formed with a recess for fitting a respective one of blocks said locking therein, an insert block being disposed beside each said recess and several thread holes and screws being disposed through said lower cover corresponding to said thread holes of said handle body for fixedly connecting said lower cover with said handle body;

said transmission mechanism includes a pressing lever, a second spring and a locating block, said pressing lever having a top mushroom cap and a lower thread end, said locating block being disposed at a lower end of said second spring, making the same fixedly connected with an upper end of one of said hollow tube members, said second spring being positioned under said mushroom cap of said pressing lever;

said linking mechanism includes a slant triangular block having a tapered lower end, a valve seat, a third spring, a pad member, a fixing sleeve and a fixing plate said slant triangular block having a slant side and said valve seat having a slant side corresponding to said slant side of said slant triangular block, said valve seat being formed with a lower lateral notch for disposing said third spring therein, said valve seat being further formed with a projection opposite to said notch, said pad member being disposed under said valve seat, said fixing sleeve being formed with a lateral orifice for said projection of said valve seat to extend outside therethrough, said fixing plate being fitted into a lower end of said fixing sleeve;

each said hollow tube member is inserted into a respective one of said through holes of said handle body and a lower end of said one of said hollow tube members is inserted over said fixing sleeve; and each said sleeve member is disposed outside a respective one of said hollow tube members and formed with several lateral locating holes.

* * * * *